ALTERNATING CURRENT POWER CONTROLLER

Filed March 19, 1965

DONALD F. O'BRIEN
INVENTOR

BY Lawrence P. Benjamin

ATTORNEY

United States Patent Office 3,370,246

Patented Feb. 20, 1968

3,370,246

ALTERNATING CURRENT POWER CONTROLLER

Donald F. O'Brien, 55 Fairview Ave., Watertown, Mass. 02172

Filed Mar. 19, 1965, Ser. No. 441,210
11 Claims. (Cl. 330—102)

ABSTRACT OF THE DISCLOSURE

A constant current device for controlling the power applied to a load utilizing a Hall effect device to sense the instantaneous voltage and instantaneous current applied to the load. The output of the Hall effect device is a signal voltage that is proportional in magnitude to the instantaneous power (the product of voltage times current) applied to the load, the sense of which is utilized in a feedback circuit that is connected to and is 180° out of phase with the input signal.

This invention relates to alternating current power amplifiers and, more particularly, to alternating current power amplifier systems having a constant power output despite any variations in either input frequency or load impedance.

In any power amplifier system utilizing voltage amplifiers at the output thereof, the amplifier must usually work or look into a fixed impedance load despite the fact that the frequency both into and out of the amplifier varies over a band.

Two examples of such devices, appearing at opposite ends of the spectrum, share this common problem. The first example involves an audio amplifier operating into a fixed impedance load as represented by a transducer for converting the electrical signals into audio or audible energy. This may be a low impedance such as a speaker voice coil (having a characteristic impedance of either 3.2, 4, 8, 16, etc. ohms) or the higher impedance of a head set (having a characteristic impedance of about 500–600 ohms). In any event, the transducer or load is designed to present its characteristic impedance to the amplifier at a given frequency. Assuming, by way of example, that a load of this sort has been designed to have a characteristic impedance of 4 ohms at a frequency of 1 kilocycle (kc.), it will be obvious that the impedance will be vastly different should the frequency at the output of the amplifier be reduced to 200 cycles as it might well be, when listening to certain music. Should the frequency rise to 15 kc., as it might well do when listening to certain other types of music, the impedance will be still different but in neither case will the load impedance be the designated 4 ohms.

In the situation where the amplifier has a 1 kc. signal at its output, since it was designed to operate into a 4-ohm load, there is no problem because it is operating into a matched load; that is, it is terminated into the one impedance that permits of optimum transfer of energy. However, when the amplifier presents a 15-kc. signal to a 4-ohm load, then the amplifier and the load are no longer matched and there will be a noticeable loss in power as a result of this mismatch. This may be readily shown in the following equations where:

(1) $$P=EI$$

and (2) $$Z=E/I$$

When Equation 2 is substituted in Equation 1, it will be seen that:

(3) $$P=E^2/Z$$

$P$=power (watts)
$E$=voltage (volts)

$I$=current (amps)
$Z$=impedance (ohms)

When observing a practical example of an amplifier having a 10-volt output at a frequency of 1 kc. that operates into a load having a characteristic impedance of 4 ohms (at 1 kc.), it will be seen that when these values are substituted in Equation 3 that:

(4) $$P=(10)^2/4=25 \text{ watts}$$

However, when one considers the situation where the amplifier output frequency is sufficiently varied from the load designed frequency so that the characteristic impedance thereof is now 5 ohms and with an output voltage of 10 volts, it will be seen that when these new values are substituted in Equation 3 that:

(5) $$P=(10)^2/5=20 \text{ watts}$$

This, then, represents a decrease of 20% in the power output.

Should the frequency vary still further from the designed frequency of the load, the characteristic impedance will become still greater, resulting in a still lower output. At best, this is a highly undesirable situation, yet it is a fact that all circuit theoreticians must face.

The second example of this problem manifests itself in the radio frequency (R.F.) portion of the spectrum and is represented by an R.F. amplifier that must drive a load or an antenna having a fixed impedance (usually 50, 75, 300, 600, etc., ohms). A transmission line is usually chosen so that it will have the same characteristic impedance as that of the antenna. However, as in the previous example of the load operating in the audio portion of the spectrum, the antenna is cut to be resonant at a given frequency and it is at this frequency only that the antenna appears as a purely resistive load. If any other frequency is presented to the antenna, reactive components are then introduced, causing the antenna to appear either longer (inductively reactive) or shorter (capacitively reactive) depending on whether the frequency presented is lower or higher than the designed frequency. Certain relatively narrow band frequency excursions may be introduced by the audio sidebands generated by an amplitude modulated signal or by the sidebands of a single sideband suppressed carrier (S.S.B.S.C.) signal or by the sidebands of the P.R.F. (pulse repetition frequency) of a pulse radar signal. On the other hand, broad band frequency excursions may be introduced by a requirement to operate on an adjacent band (separated by the order of megacycles from the designed frequency) to meet operational requirements (jamming or etc.). In all cases, as is well known, when a transmission line is not terminated in its characteristic impedance, voltage standing waves are set up in the transmission line which tend to dissipate the power instead of allowing it to be radiated by the antenna. This, of course, is a highly undesirable feature, and a feature which has been long recognized by the antenna designer.

I have found that I am able to achieve constant power gain over a relatively broad band of frequencies by sampling the amplifier power output as it is applied to the load, deriving a signal therefrom that is representative of the applied power and utilizing this signal in a negative feedback configuration to adjust the power in accordance with any power variations that may result from load impedance changes that may have been caused by frequency excursions.

It is, therefore, an important object of the present invention to provide a system having a stable, constant power gain.

Another important object of the present invention is to provide a system that is capable of stable, constant power gain and is insensitive to any frequency variations that may appear at the input thereof.

Still another important object of the present invention is to provide a system that is capable of stable, constant power gain and is insensitive to any frequency variations that may appear at the input thereof yet is applicable to any amplifier system operating in a band of frequencies ranging from the audio portion of the spectrum to the R.F. portion of the spectrum.

My system utilizes a combiner device that samples the power applied to the load and produces a signal at its output that is proportional to the sampled power. This signal is used as a negative feedback signal to be mixed with the input signal and thereby adjust the power output.

The features of my invention which I believe to be novel are set forth with particularity in the appended claims. My invention itself, however, both as to its organization and method of operation, together with further objects and advantages thereof, may be best understood by reference to the following description taken in conjunction with the accompanying drawings in which:

As will be hereinafter used, the word "combiner" will be used to denote any device which samples both the current and the voltage simultaneously applied to the load and which has an electrical output therefrom that is proportional to the product of the instantaneous current and voltage supplied to the load. Thus, in this context, it will be seen that while this definition is satisfied by a Hall effect device, any other multiplier will suffice, such as a Wilby multiplier, quarter square multiplier, vacuum tube multiplier, etc.

While the foregoing description will be slanted in terms of a Hall effect device, it will be obvious to those skilled in the art that my invention may be suitably modified to accommodate other applicable combiners.

Since this invention will, for purposes of illustration, be described in terms of a Hall effect device combiner, it would be expedient to now describe a Hall effect device.

A Hall effect device comprises a Hall plate, typically made of indium arsenide or gallium arsenide, and which exhibits the Hall effect; that is, when cut by a field flux through its thin dimension and threaded by a current flowing between two opposite edges, a voltage will appear across the conjugate edges. This voltage, at any instant, will be proportional to the product of the field flux and the input voltage, with the field flux being proportional to the current generating the field flux. In certain cases, the Hall plate is positioned in the air gap of an electromagnet having an energizing coil which produces the field flux. When used in an R.F. application, any other suitable energizing means for producing a field flux may be used, the only requirement being that the field flux vary at the R.F. rate and that its strength be proportional to the current flow.

Figure 1:
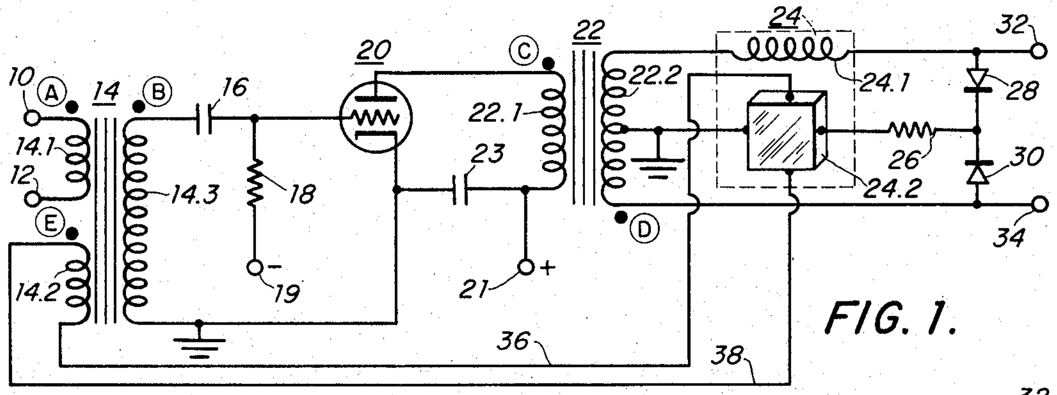
FIG. 1 is one operative embodiment, utilizing the principles of my invention, that has particular utility in the audio portion of the spectrum.

Referring now to FIG. 1, there is provided a pair of input terminals 10 and 12 by means of which a signal may be applied to my novel system, the input signal varying in frequency at an audio rate. This signal may be the output of a microphone, the output of a tuner or may even be the output of another amplifier. In any event, it is a signal in the audio portion of the spectrum that is required to be amplified and then applied to a load such as the voice coil of a speaker (not shown) connected at terminals 32, 34. These signals are electromagnetically coupled by means of first primary winding 14.1 of transformer 14 to secondary winding 14.3. One end of the secondary winding is connected to ground while the other end thereof is coupled by means of capacitor 16 as the input to the grid element of amplifier device 20. Since amplifier 20 is a typical audio amplifier, it is felt that no detailed exegesis is required insofar as its operation is concerned. An appropriate bias is also applied to the grid element of amplifier 20 by means of resistor 18 having one end connected to the grid and its other end connected to the source of bias potential (not shown) applied to terminal 19. The cathode element of amplifier 20 is connected directly to ground while the plate element thereof is connected to an appropriate source of operating potential (B+) applied to terminal 21 through primary winding 22.1 of transformer 22. A suitable bypass capacitor 23 is connected between ground and terminal 21 to prevent any audio frequencies from being fed back into the source of operating potential. Transformer 22, having transformer 22.1 as the primary thereof, has a center-tapped secondary winding 22.2 across which the amplified audio frequencies are generated so that they may be applied to output terminals 32, 34.

It will be seen that my combiner device 24 is located between the output of the amplifier 20 and the input to the load terminals 32, 34 with one element of the combiner being inserted in one of the output leads. The current flowing through this lead must then pass through the field flux producing coil 24.1 to produce a field flux in which the Hall plate 24.2 is placed. Connected between terminals 32, 34 and/or the respective leads from transformer winding 22.2 are a pair of back-to-back diodes 28 and 30 to detect any voltage appearing across either diode of ground. The circuit is completed to ground by means of dropping resistor 26 having one end connected to the common junction of diodes 28, 30 and its other end connected to one edge of Hall plate 24.2. The opposed edge of Hall plate 24.2 is connected to ground to complete the voltage sampling circuit.

Across the conjugate edges of Hall plate 24.2 are a pair of leads 36 and 38 which are connected to respective ends of the second primary winding 14.2.

Figure 3:
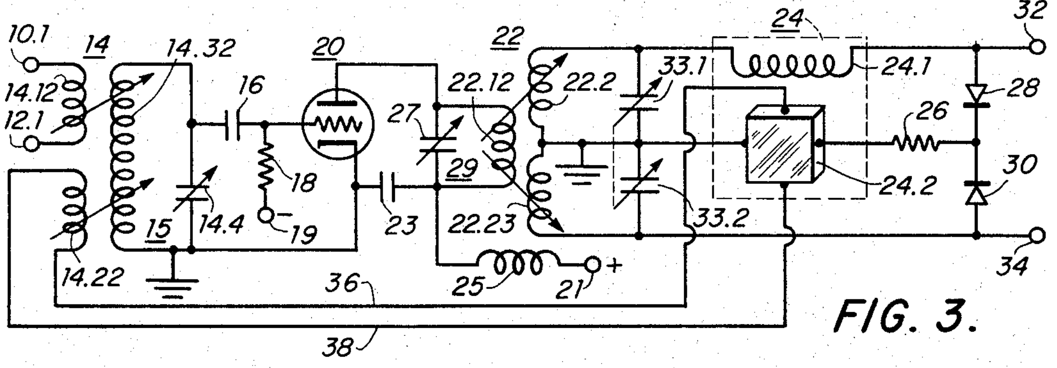
FIG. 3 is another embodiment, utilizing the principles of my invention, that has particular utility in the R.F. portion of the spectrum.

Referring now to FIG. 3, there is provided a pair of terminals 10 and 12 to which an alternate current signal is applied that varies in frequency at an R.F. rate. This, characteristically, may be provided by another or preceding amplifier, mutiplier or buffer stage (not shown). In any event, it is a signal in the R.F. portion of the spectrum that is required to be amplified and then applied to a load, such as an antenna (not shown), connected at terminals 32, 34. Alternatively, a transmission line or a wave guide may be suitably coupled thereto in any of many well-known manners.

Terminals 10 and 12 are connected to the respective ends of primary winding or inductor 14.12 of transformer 14 and electromagnetically coupled to the secondary winding or inductor 14.32. Since the desired operation is in the R.F. portion of the spectrum, the coupling between the primary and secondary windings may be varied as shown by the arrow interconnecting the two windings and thus vary the power gain of the system. The secondary winding may be made to resonate at a particular band of frequencies by the variable capacitor 24.4 connected in shunt across inductor or winding 14.32. This combination of inductor-capacitor forms a parallel-tuned circuit 15 having one end connected to ground and its other end coupled by means of capacitor 16 to the grid element of amplifier tube 20. Since tube 20 is a typical R.F. amplifier, it is felt that no detailed exegesis is necessary regarding its amplifying characteristics. An appropriate bias voltage (not shown) for determining the operating characteristics of tube 20 is provided at terminal 19 and applied to the grid element by means of resistor 18.

Cathode element of tube 20 is connected directly to ground while the plate element thereof is connected to one end of parallel-tuned circuit 29 consisting of variable capacitor 27 which is connected in shunt across inductor 22.2. A source of operating potential (not shown) is available at terminal 21 with a suitable R.F. choke 25 being connected between the other end of tank circuit 29 and terminal 21 to provide amplifier 20 with a source of operating potential. The combination of capacitor 23 and choke 25 represents a means for preventing any R.F. from appearing in the source of operating potential.

Transformer 22 consists of primary winding or inductor 22.12 of tank circuit 29 and secondary windings or inductors 22.22 and 22.23. The coupling between the primary and secondary windings are made variable as indicated by the arrow. It should be noted that this secondary winding consists of the windings or inductors 22.22 and 22.23 having a grounded center tap with each section being a parallel-tuned circuit. Variable capacitor 33.1 is connected across inductor 22.22 while variable capacitor 33.2 is connected in parallel with inductor 22.23. The common junction between these two tank circuits is connected to ground while the other ends thereof are connected to terminals 32, 34 by appropriate leads. Combiner means 24 for sampling the power applied to terminals 32, 34 is located between the output of amplifier 20 and the input terminals 32, 34 with one element of the combiner means 24 being inserted in one of the leads. The current flowing through this lead must then pass through an appropriate field flux producing coil or inductor 24.1 to produce a field flux in which the Hall pate 24.2 is placed. Connected between terminals 32, 34 and/or the respective leads from transformer winding 22.2 are a pair of back-to-back diodes 28 and 30 to detect any voltage appearing across either diode to ground. The circuit is completed to ground by means of dropping resistor 26 having one end connected to the common junction of diodes 28, 30 and its other end connected to one edge of Hall plate 24.2. The opposed edge of Hall plate 24.2 is connected to ground to complete the voltage sampling circuit.

Across the conjugate edges of Hall plate 24.2 are a pair of leads 36 and 38 which are connected to respective ends of the second primary winding or inductor 14.22.

Figure 4:
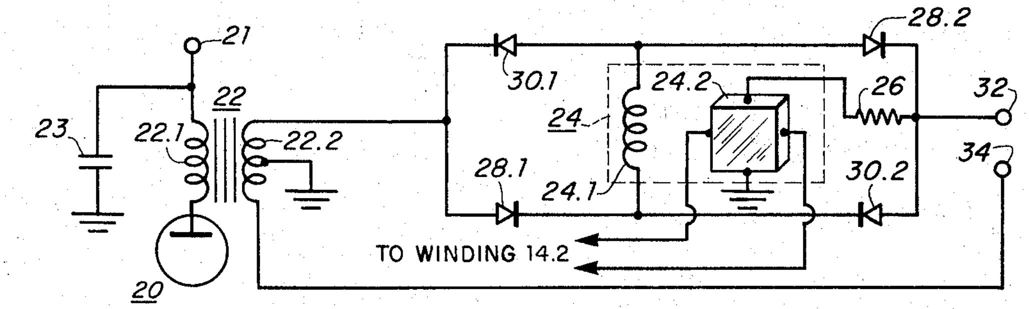
FIG. 4 is still another embodiment, utilizing the principles of my invention.

Referring now to FIG. 4, there is shown a partial schematic diagram of still another embodiment of my invention. With the exception of the placement and the method of utilizing the Hall effect device, this embodiment is identical in all other respects with the embodiment of FIG. 1. All of the elements up to and including amplifier transformer 22 are identical to the similar elements previously described with regard to FIG. 1. However, in this embodiment, instead of utilizing the field flux producing coil 24.1 in series with one of the output leads, this embodiment proposes the use of four diodes 28.1, 28.2 and 30.1, 30.2 in bridge configuration with the field flux producing coil 24.1 connected across the conjugate corners of the bridge. The output of transformer 22.2 is applied to one corner of the bridge while the opposite corner of the bridge is connected to output terminal 32. Dropping resistor 26 is connected between terminal 32 and one edge of Hall plate 24.2 while the corresponding opposite edge of Hall plate 24.2 is connected to ground to complete the voltage detecting circuit. The conjugate edges of Hall plate 24.2 are connected, as indicated, to winding 14.2 of FIG. 1.

MODE OF OPERATION

It should be understood at this juncture that while the description of the operation will be slanted in terms of an amplifier operating in the audio portion of the spectrum, the description applies with equal force to amplifiers operating in the R.F. portion of the spectrum.

Similarly, while the description of both embodiments shows amplifier 20 as a characteristic vacuum tube amplifier, it will be obvious to those skilled in the art that appropriate solid state devices such as transistors may be substituted therefor without departing from the inventive concept.

Figure 2:
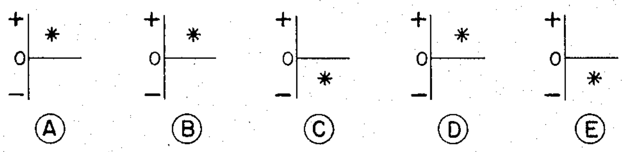
FIG. 2 is a graphic representation of the phasing required for the transformers of FIG. 1.

Referring now to FIGS. 1 and 2, it will be seen that when an AC signal is applied to terminals 10 and 12 for connection to winding 14.1, the signal is electromagnetically coupled to the grid element of amplifier 20 by means of secondary winding 14.3. Assuming that the instantaneous polarity of the input signal is positive as shown at point A (FIGS. 1 and 2), it is desired that the secondary winding of transformer 14 be poled in such a manner that a positive signal will appear at point B (FIGS. 1 and 2) to be coupled to the grid element of amplifier 20. This positive-going signal makes amplifier 20 conduct more heavily (typical Class A operation) by overcoming any bias on the grid and, thereby, causes the plate voltage (point C) to go negative. This negative-going signal, which appears in winding 22.1 of transformer 22, is electromagnetically coupled to secondary winding 22.2, which latter winding is poled in such a manner as to provide a positive-going signal at point D. Thus, diodes 28 and 30 alternately conduct on each half cycle producing a pulsating DC across Hall plate 24.2 wherein the pulsations are twice the rate of the frequency of the signal applied at terminals 10, 12. Simultaneously, with the appearance of the pulsating DC appearing across the Hall plate, the current flowing through winding 24.1 of combiner 24 causes the field flux generated by winding 24.1 to first flow in one direction for one-half cycle and then in the opposite direction for the next half cycle depending on the direction of the current flow in winding 24.1. This alternating field flux produces an alternating current across the conjugate sides of Hall plate 24.2 such that, when coupled by means of leads 36 and 38 to respective ends of winding 14.2, there is produced in winding 14.2 a signal that is instantaneously negative-going at point E and positive-going at the other end of the coil winding. Winding 14.2 is poled in such a manner as to always product a signal therein that is 180° out of phase with the signal applied at terminals 10 and 12.

While the foregoing exposition of the mode of operation was in terms of a pair of back-to-back diodes 28, 30 connected across terminals 32, 34 to produce a pulsating unidirectional voltage across Hall plate 24.2 and a bipolar output from Hall plate 24.2, it should now be apparent that the same effect may be achieved by producing a pulsating unidirectional current through the field flux producing coil and a bidirectional voltage across the Hall plate 24.2. In both cases, the output of the Hall plate 24.2 will be bipolar so that any signal derived therefrom which is proportional to the power applied to the load, is then applied to winding 14.2 of FIG. 1 as in the previously described embodiment.

As a result of the multiplicative properties inherent in a Hall effect device as well as the particular arrangement of the diodes (28, 30 in FIGS. 1 and 3, and 28.1, 28.2, and 30.1, 30.2 in FIG. 4) associated with the Hall effect device, the signal voltage developed across the conjugate edges of Hall plate 24.2, to be applied to winding 14.2 of FIG. 1 (winding 14.12 of FIG. 3), has an amplitude that is proportional to the instantaneous power supplied to load terminals 32, 34, and has a polarity that is always 180° out of phase with respect to the signal to be amplified applied to winding 14.1 of FIG. 1 (winding 14.12 of FIG. 3).

Since the signal voltage appearing across winding 14.3 of FIG. 1 (14.32 of FIG. 3) represents the algebraic sum of the signals appearing in windings 14.1 and 14.2 of FIG. 1 (windings 14.12 and 14.22 of FIG. 3), there is a negative feedback around the whole loop which assures stable operation. Thus, there is presented a device, and various embodiments thereof, capable of maintaining constant the power gain of the system despite frequency variations at its input or impedance changes at its output.

While there has been described what is presently considered the preferred embodiments of the invention, it will be obvious to those skilled in the art that various changes and modifications may be made therein without departing from the inventive concept contained therein and it is, therefore, aimed in the appended claims to cover all such changes and modifications as fall within the true spirit and scope of the invention.

I claim:

1. An amplifier system for driving a load the impedance of which is caused to vary by frequency changes at the input to the system, comprising:

transformer means having a pair of primary input windings;

a secondary winding on the transformer electromagnetically coupled to the primary input windings for deriving an algebraic sum signal of any signal voltages applied to the primary input windings;

a first signal voltage, of a given instantaneous polarity, applied to one primary input winding;

output means for connection to the load;

amplifier means connected between the secondary winding and the output means, the amplifier means amplifying any signal voltages appearing in the secondary winding;

combiner means detecting the instantaneous current and voltage applied by the amplifier means to the output means and deriving a second signal therefrom the magnitude of which is proportional to the product of the instantaneous current and voltage applied to the output means; and means applying the second signal voltage to the other primary input winding 180° out of phase with the instantaneous polarity of the first signal voltage.

2. The system of claim 1 wherein:

the first signal voltage is in the audio portion of the spectrum.

3. The system of claim 2 wherein:

the combiner means is a Hall effect device including a Hall plate and a field flux producing coil;

the field flux producing coil connected in series between the amplifier means and the output means to produce a field flux proportional to the current flowing therethrough applied to the load; and means connected between the output means and the Hall plate to apply a voltage across the Hall plate proportional to the instantaneous voltage applied to the load.

4. The system of claim 3 wherein:

the means connected between the output means and the Hall plate consists of a pair of back-to-back diodes in series connection across the output means and a series resistor connected between the Hall plate and the common junction of the series connected diodes;

the current through the field flux producing coil is bidirectional;

the voltage applied to the Hall plate is a pulsating, unidirectional voltage; and the second signal voltage is bipolar.

5. The system of claim 3 further comprising:

four diodes, in bridge circuit configuration;

one corner of the bridge circuit connected to the amplifier means with the corresponding opposite corner connected to the output means; and means connecting the field flux producing coil across the conjugate corners of the bridge.

6. The system of claim 5 wherein:

the current through the field flux producing coil is a pulsating, unidirectional current;

the voltage across the Hall plate is bidirectional; and the second signal voltage is bipolar.

7. The system of claim 1 wherein:

the first signal voltage is in the radio frequency portion of the spectrum.

8. The system of claim 7 wherein:

the combiner means is a Hall effect device including a Hall plate and a field flux producing coil;

the field flux producing coil connected in series between the amplifier means and the output means to produce a field flux proportional to the current flowing therethrough applied to the load; and means connected between the output means and the Hall plate to apply a voltage across the Hall plate proportional to the instantaneous voltage applied to the load.

9. The system of claim 8 wherein:

the means connected between the output means and the Hall plate consists of a pair of back-to-back diodes in series connection across the output means and a series resistor connected between the Hall plate and the common junction of the series connected diodes;

the current through the field flux producing coil is bidirectional;

the voltage applied to the Hall plate is a pulsating, unidirectional voltage; and the second signal voltage is bipolar.

10. The system of claim 8 wherein:

four diodes, in bridge circuit configuration;

one corner of the bridge circuit connected to the amplifier means with the corresponding opposite corner connected to the output means; and means connecting the field flux producing coil across the conjugate corners of the bridge.

11. The system of claim 10 wherein:

the current through the field flux producing coil is a pulsating, unidirectional current;

the voltage across the Hall plate is bidirectional; and the second signal voltage is bipolar.

References Cited

UNITED STATES PATENTS

| | | | |
|---|---|---|---|
| 2,166,929 | 7/1939 | Caruthers | 330—102 |
| 2,358,480 | 9/1944 | Skilling | 330—105 X |
| 3,102,241 | 8/1963 | Johnstone | 330—29 X |
| 3,134,080 | 5/1964 | Story | 330—102 |
| 3,254,308 | 5/1966 | McLean et al. | 330—29 X |
| 3,284,726 | 11/1966 | Kotecki | 307—88.5 X |

FOREIGN PATENTS

| | | |
|---|---|---|
| 1,265,974 | 5/1961 | France. |
| 484,332 | 5/1938 | Great Britain. |

ROY LAKE, *Primary Examiner.*

J. B. MULLINS, *Assistant Examiner.*